Patented Sept. 1, 1942

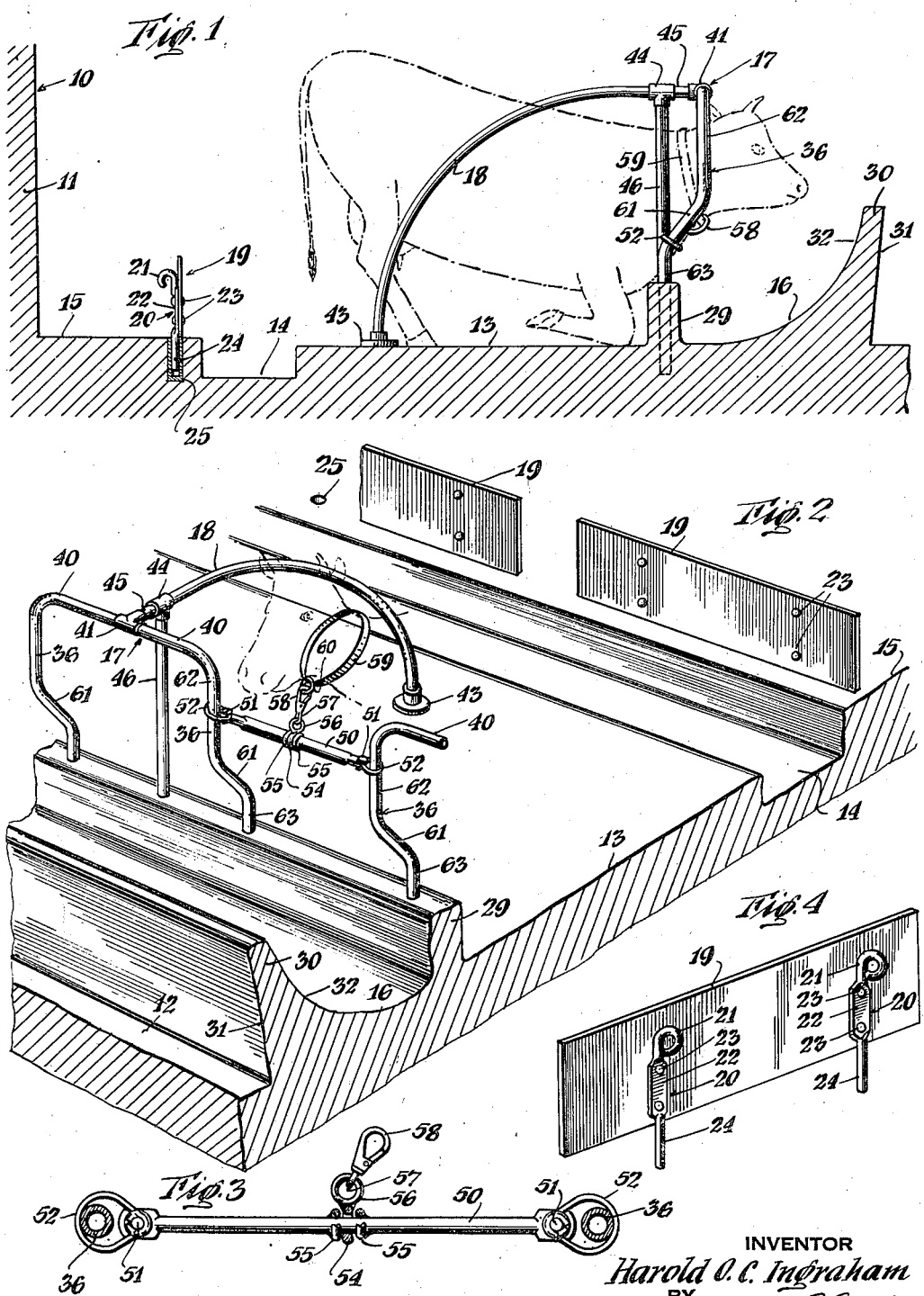

2,294,781

UNITED STATES PATENT OFFICE 2,294,781

STALL AND STANCHION FOR DAIRY BARNS

Harold O. C. Ingraham, New York, N. Y.

Application May 21, 1941, Serial No. 394,414

3 Claims. (Cl. 119—119)

The present invention relates to dairy barns, and more particularly to a stall and stanchion therefor.

One object of the present invention is to provide a dairy barn having new and improved features of construction.

Another object is to provide a stall so constructed and arranged as to hold the cow in proper position, well up in the stall toward its manger and away from the litter aisle.

Another object is to provide a stanchion having novel and improved features of construction.

Another object is to provide a stanchion so designed as to limit the rearward movement of the cow, and to follow the normal movement of the cow while lying down or getting up.

Various other objects of the invention will be apparent from the following particular description, and from an inspection of the accompanying drawing, in which Fig. 1 is a fragmentary vertical section through a stall embodying the present invention.

Fig. 2 is a fragmentary perspective of the stall shown in Fig. 1.

Fig. 3 is a detail view of a stanchion embodying the present invention, and

Fig. 4 is a perspective view of a removable shield, adapted to be positioned rearwardly of the litter gutter to prevent spreading of the litter from said gutter to the litter deck or aisle.

In the specific form of the invention shown, the dairy barn 10 is provided with side walls 11, and with two opposed rows of adjoining stalls extending the length of the barn and separated by a feed aisle 12. Extending lengthwise of the barn on each side of the feed aisle 12 is a manger 16, a stall floor 13, a litter gutter 14, and a litter aisle or deck 15 between the barn wall 11 and said gutter 14. A stanchion 17, to be hereinafter described, confines the cows in their individual stalls, and includes curved bracing rods or pipes 18, defining the sides of said stalls.

One difficulty commonly encountered in dairy barns of the above type is the tendency of the cow to step back upon the litter aisle 15 instead of standing in proper position in the stall. This tendency is increased by the standard practice of building the litter aisle lower than the stall floor and, in the case of chain stanchions, by allowing a considerable freedom of movement for the cow.

In accordance with the present invention, I provide a stanchion, which holds the cow well up toward the manger while in standing position. I also build the litter aisle on a higher level than the stall floor, so as to provide a rear gutter wall suited to confine the litter to the gutter, and provide a shield to further prevent the litter from falling or splashing onto the litter aisle. I have found, for instance, that the litter is more completely confined to the gutter by making the litter aisle 15 about two inches higher than the stall floor 13. This has the additional advantage of reducing the tendency of the cow to step back on to said aisle, because a cow dislikes to stand with her hind feet at a higher elevation than her front feet.

Fur further aid in preventing the spreading of the litter from the gutter 14 on to the aisle 15, a shield 19 is provided in the back of each stall sufficiently close to the gutter to prevent the cow from standing on the ledge between the shield and the gutter. The shield may be made of any suitable material, and may comprise a rectangular metal plate having rigidly secured to one side thereof a pair of brackets 20, each bracket being formed from a round bar, and having its upper end curved to form a finger loop 21, and its intermediate section 22 flattened for easy rigid attachment to the shield 19 by suitable fastening means, shown as rivets 23. The lower end section 24 of each bracket 20 projects downwardly beyond the lower edge of the shield plate 19 for free entry into a hole 25 provided in the litter aisle 15.

The attendant can easily mount the shield 19 in position shown in Figs. 1 and 2 by supporting said shield through the finger bracket loops 21, while lowering said shield to effect entry of the lower projecting bracket sections 24 into the corresponding aisle holes 25. These holes 25 are deep enough to permit seating of the lower edge of the shield plate 19 on said aisle, as shown in Figs. 1 and 2. A row of such shields extends along the litter aisle in back of the various stalls. The ends of adjacent shields may be spaced for convenience in handling.

In mounted position, the shields 19 prevent spreading of the litter from the gutter 14 on to the aisle 15. At the same time they act as a barrier obstructing rearward movement of the cow towards the aisle 15. When it is desired to clean the aisle 15, the shield 19 is easily removed to permit sweeping or shoveling of the litter from said aisle into the gutter 14.

The shield plate 19 may be of any suitable size for the purpose set forth. For instance, I have found that a plate about twelve inches high is satisfactory for the purpose described.

The manger 16 is preferably in the form of a trough, having an inner wall 29 of substantially rectangular cross-section, serving as a curb for the stall floor 13, and an outer wall 30 substantially higher than said inner wall. The outer side 31 of the wall 30 is substantially vertical, while its inner side 32 curves downwardly and rearwardly towards the stall floor level to receive the feed.

As another feature of the present invention, the stanchion 17 is designed to effectively confine the movement of the cow without impeding her freedom of movement necessary for feeding or for lying down. For that purpose the stanchion support comprises a pair of spaced posts 36, which are preferably of tubular construction, and which have their lower ends imbedded in the manger wall 29. The upper end section 40 of each post 36 extends substantially horizontally, and connects into a branch of a T 41, the other branch being connected to the similar post structure of an adjoining stall. The bracing rod or pipe 18, preferably of tubular construction, has threaded or secured to its lower end a flanged collar 43 fixed to the stall floor by bolts or other suitable means, and has its upper end connected to a branch of a T 44. The other branch of this T 44 is connected to the stem of the T 41 by a nipple 45. An upright prop 46, preferably of tubular construction, has its lower end imbedded in the manger wall 29, and its upper end connected to the T 44.

In accordance with my invention I provide a bar stanchion 50, extending between the posts 36, and freely slidable therealong to permit up and down movement of the cow's head. This bar stanchion 50 is preferably made of tubular stock, and has its ends flattened and formed with respective holes to receive rivets or bolts 51. A collar 52, preferably in the form of a bent rod, is firmly secured to each end of the bar stanchion 50 by the bolts 51. The ends of said rod 52 may be bent to form eyes suited to receive said bolts. These collars 52 loosely encircle the respective posts 36, and thereby permit free slidable movement of the bar stanchion 50 along said posts.

For fastening the cow to the bar stanchion 50, there is provided a rotatable collar 54, loosely encircling the middle of said bar stanchion, and retained against axial movement therealong by a pair of bosses 55 affixed to said bar. The collar 54 carries a ring 56 to which is connected the eye 57 of a snap swivel 58. The snap swivel 58 is free to rotate about the eye 57 in response to movement of the cow's head.

The cow is provided with a halter or neck band 59 carrying a ring 60 into which the snap swivel 58 is snapped. The bar stanchion thus hangs from the cow's neck and slides vertically on the posts in response to corresponding movement of the cow. However, the connection between the halter 59 and the bar stanchion 50 is such as to afford only a limited forward and backward movement of the cow, and thereby holds the cow well forward in the stall.

A cow's body moves rearwardly a slight distance when lying down from a standing position and, when rising, moves forwardly about the same amount. I have found that this distance averages, for cows of various sizes, about 6½ inches. In order to provide ample freedom for this movement, I provide the stanchion posts 36 with offsets 61, inclined upwardly and forwardly of the stall between substantially vertical sections 62 and 63. The offsets 61 may begin at a height of about 16 inches above the stall floor, and extend to about 25½ inches above the stall floor, and are inclined to bring the sections 62 about 6½ inches ahead of the sections 63. The above dimensions, however, are only representative, and have been found satisfactory in a particular instance.

When the cow is standing, the bar stanchion 50 will extend between the upper forward vertical sections 62 of the posts 36. When the cow lies down, the bar stanchion 50 slides downwardly and rearwardly along the inclined offset sections 61 to the lower vertical sections 63 of the posts 36. When the cow rises from lying position, the movements of the bar stanchion will be reversed from that described.

By providing the inclined stanchion posts as above described, the bar stanchion 50 follows the natural movement of the cow without unduly restricting the same, but at the same time holds the cow in the desired forward position in the stall. This, in combination with the raised litter aisle 15 and the shields 19, ensures the disposal of the litter in the gutters 14, and maintains the litter aisle 15 substantially clear, an important feature in modern dairies supplying the better grades of milk, which are subject to rigid sanitary regulations.

As many changes may be made in the above design, and many apparently different embodiments of this invention may be made without departing from the scope of the claims, it is intended that all matter contained in the above description or shown in the accompanying drawing shall be interpreted as illustrative and not in a limiting sense. The invention is only to be limited in accordance with the following claims.

What is claimed is:

1. A stall of the class described comprising a pair of spaced stanchion posts adapted to receive the head of a cow therebetween, a rigid bar stanchion extending between said posts and slidable thereon, a collar loosely mounted on said bar for rotational movement about the axis of said bar, bosses on said bar on opposite sides of said collar forming stops to confine said collar against axial movement, and a snap member attached to said collar, said snap member being adapted to releasably engage a cow's halter for limiting the forward and rearward movement of the cow.

2. A stall of the class described comprising a pair of spaced stanchion posts, a rigid bar stanchion extending between said posts and slidable thereon, a member carried by said bar stanchion and adapted to be connected to a cow's halter, each of said posts having a lower vertical portion positioned to receive said stanchion when the cow is lying down, and an upper vertical portion to receive said stanchion when the cow is standing, said upper vertical portion being offset forwardly from said lower vertical portion by a distance corresponding to the normal forward movement of a cow in rising from lying to standing positions, said posts having an inclined intermediate portion joining said upper and lower vertical portions and positioned to guide the stanchion therebetween in a path corresponding to the forward and vertical movement of the stanchion required to accommodate the normal movement of the cow in rising.

3. A stall of the class described comprising a pair of spaced stanchion posts adapted to receive the head of a cow therebetween, a rigid bar stanchion extending between said posts and having eyes at its ends slidable on said posts, a collar loosely mounted on said bar for rotational movement about the axis of said bar, bosses on said bar on opposite sides of said collar forming stops to confine said collar against axial movement, and a member connected to said collar and constructed and arranged to attach said collar to a cow's halter for limiting the forward and rearward movement of the cow.

HAROLD O. C. INGRAHAM.